(12) United States Patent
Andre et al.

(10) Patent No.: US 9,083,493 B2
(45) Date of Patent: Jul. 14, 2015

(54) METHOD AND A DEVICE FOR REDUCING THE ELECTRICITY CONSUMPTION ASSOCIATED WITH A COMMUNICATIONS LINE

(75) Inventors: Jean-Marie Andre, Tregomeur (FR); Hubert Mariotte, Perros-Guirec (FR)

(73) Assignee: FRANCE TELECOM, Paris (FR)

( * ) Notice: Subject to any disclaimer, the term of this patent is extended or adjusted under 35 U.S.C. 154(b) by 636 days.

(21) Appl. No.: 13/512,763

(22) PCT Filed: Nov. 29, 2010

(86) PCT No.: PCT/FR2010/052561
§ 371 (c)(1),
(2), (4) Date: Aug. 23, 2012

(87) PCT Pub. No.: WO2011/064513
PCT Pub. Date: Jun. 3, 2011

(65) Prior Publication Data
US 2012/0319467 A1    Dec. 20, 2012

(30) Foreign Application Priority Data
Nov. 30, 2009   (FR) ...................................... 09 58494

(51) Int. Cl.
*H04L 5/00* (2006.01)
*H04B 15/00* (2006.01)

(52) U.S. Cl.
CPC ............ *H04L 5/0044* (2013.01); *H04L 5/0064* (2013.01); *H04L 5/0007* (2013.01)

(58) Field of Classification Search
USPC .......................................................... 307/89
See application file for complete search history.

(56) References Cited

U.S. PATENT DOCUMENTS

| 6,259,746 B1 | 7/2001 | Levin et al. |
|---|---|---|
| 2005/0213405 A1 | 9/2005 | Stopler |
| 2010/0177838 A1* | 7/2010 | Schenk .......................... 375/285 |

FOREIGN PATENT DOCUMENTS

EP    1998524 A1    12/2008

OTHER PUBLICATIONS

International Search Report and Written Opinion dated Mar. 3, 2011 for corresponding International Application No. PCT/FR2010/052561, filed Nov. 29, 2010.
International Preliminary Report on Patentability and English translation of the Written Opinion dated Jul. 4, 2012 for corresponding International Application No. PCT/FR2010/052561, filed Nov. 29, 2010.
French Search Report dated Jun. 2, 2010 for corresponding French Application No. FR 0958494, filed Nov. 30, 2009.

* cited by examiner

*Primary Examiner* — Robert Deberadinis
(74) *Attorney, Agent, or Firm* — David D. Brush; Westman, Champlin & Koehler, P.A.

(57) ABSTRACT

A method and device are provided for reducing electricity consumption associated with a communications line having a set of N carriers of predetermined power suitable for conveying information to a receiver device. The method is adapted to determine first and second groups, each having respectively at least one of the carriers of the set N; to determine a volume of information to be conveyed on the N carriers during a unit of time; and if the determined volume is less than a predetermined threshold, to allocate a power less than the predetermined power to the carriers of the second group, the power of the carriers of the first group being maintained.

9 Claims, 3 Drawing Sheets

METHOD AND A DEVICE FOR REDUCING THE ELECTRICITY CONSUMPTION ASSOCIATED WITH A COMMUNICATIONS LINE

CROSS-REFERENCE TO RELATED APPLICATIONS

This Application is a Section 371 National Stage Application of International Application No. PCT/FR2010/052561, filed Nov. 29, 2010, which is incorporated by reference in its entirety and published as WO 2011/064513 on Jun. 3, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of communications, and more particularly to the electricity consumption of equipment associated with digital subscriber lines.

BACKGROUND OF THE DISCLOSURE

Communications techniques enable digital signals to be sent and received at very high bit rates. These communications techniques, which are known generically as digital subscriber line (DSL) or xDSL, include, by way of example, asymmetric digital subscriber line (ADSL) and its derivatives ADSL2, ADSL2plus, symmetric digital subscriber line (SDSL), or indeed very high bit rate digital subscriber line (VDSL), and VDSL2.

In the context of sustainable development, it is desirable to diminish the electricity consumption associated with communications lines.

The standard ITU-T G.992.3 describes a so-called "L2" mode for reducing the power of an ADSL2 line when there is a reduction in traffic. More precisely, that mode enables the power with which a down signal is sent over a digital subscriber line to be reduced, i.e. a signal going from the exchange to the client equipment.

An ADSL2 line has a certain number of carriers for transporting data. Some of the carriers are reserved for transporting data in the up direction (from the client to the exchange). Other carriers are reserved for transporting data in the down direction (from the exchange to the client).

When there is a large amount of traffic (mode L0), each carrier has a predetermined power as is needed for transporting the data.

On changing to L2 mode, the power of each carrier is diminished by a predetermined number of decibels. A decrease of 10 decibels (dB) may for example give rise to an energy saving of 500 milliwatts (mW) per ADSL2 line.

Nevertheless, that mode leads to very strong variations in noise power on neighboring lines. Those variations have the consequence of numerous disturbances such as signal losses, high error rates, resynchronization.

There therefore exists a need for a low consumption mode that does not disturb neighboring lines.

SUMMARY

An exemplary embodiment of the invention provides a method of reducing electricity consumption associated with a communications line having a set of N carriers of predetermined power suitable for conveying information to a receiver device, the method being characterized in that it comprises the following steps:

determining first and second groups, each having respectively at least one of the carriers of the set N;

determining a volume of information to be conveyed on the N carriers during a unit of time; and if the determined volume is less than a predetermined threshold, allocating a power less than the predetermined power to the carriers of the second group, the power of the carriers of the first group being maintained.

Juxtaposing carriers of diminished power with carriers of high power enables electricity consumption to be diminished while limiting the disturbances on neighboring lines.

Maintaining at least one carrier at high power enables neighboring lines to be disturbed less when changing mode, i.e. when changing from a full power mode in which all of the carriers have the predetermined power P to a reduced power mode, or when changing from a reduced power mode to a full power mode.

In a particular implementation of the electricity consumption method, the power allocated to the carriers of the second group is of a predetermined value.

This implementation presents the advantage of being simple since it does not require the power that is to be allocated to be calculated.

In another particular implementation of the electricity consumption method that can be used on its own or in combination with the preceding implementation, a carrier of the first group lies between two carriers of the second group.

This implementation is simple to implement. Alternating carriers at full power with carriers at diminished power achieves a significant reduction in consumption. Furthermore, the disturbances on neighboring lines are less than those generated by the L2 mode.

In another particular implementation of the electricity consumption reduction method, the first group has at least one set of consecutive carriers.

This implementation enables the disturbances on neighboring lines to be decreased even more.

In a particular implementation of the electricity consumption reduction method, the power allocated is a value lying between a predetermined minimum power value and the predetermined power.

This implementation enables the disturbances on neighboring lines to be further limited, while still having a large saving in consumption.

In a particular implementation of the electricity consumption reduction method, the first group is constituted by a carrier.

According to a characteristic of this implementation, the set of carriers is an ordered set, the second group comprises a first subgroup containing the carriers of rank lower than the carrier of the first group and a second subgroup containing the carriers of rank greater than the carrier of the first group, the power allocated to the carriers of the first subgroup increases as a function of the rank of the carrier, and the power allocated to the carriers of the second subgroup decrees as a function of rank.

This implementation is easy to put into practice. The distribution of powers shaped like a gable end greatly limits the impact on neighboring communications lines.

An embodiment of the invention also provides a device for reducing electricity consumption associated with a communications line having a set of N carriers of predetermined power suitable for conveying information to a receiver device, the electricity consumption reduction device being characterized in that it comprises:

means for determining a first group and a second group respectively comprising at least one carrier of the set N;
   means for determining a volume of information to be conveyed over the N carriers during a unit of time; and
   means for allocating a power less than the predetermined power to the carriers of the second group if the determined volume is less than a predetermined threshold, the power of the carriers of the first group being maintained.

Finally, an embodiment of the invention provides a computer program product including instructions for implementing the steps of the electricity consumption reduction method as described above, when loaded in and executed by a processor.

BRIEF DESCRIPTION OF THE DRAWINGS

Other features and advantages appear from the following description of embodiments given as non-limiting examples with reference to the accompanying drawings, in which.

DETAILED DESCRIPTION OF ILLUSTRATIVE EMBODIMENTS

Figure 1:
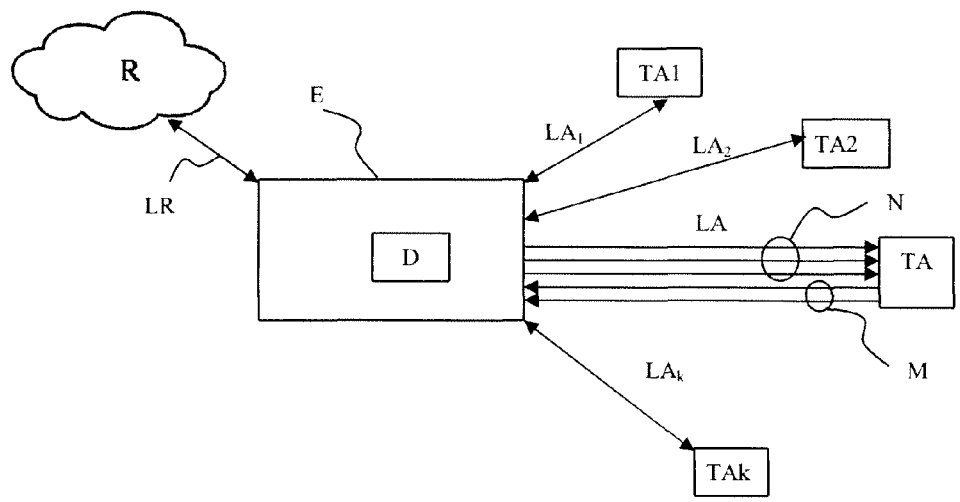
FIG. 1 shows the general context of the invention in an embodiment.

FIG. 1 is a diagram showing the general context of the invention in an embodiment.

A digital subscriber line access multiplexer (DSLAM) E, e.g. installed in the premises of a telephone exchange, is suitable both for receiving information from a network R, such as the Internet, for example, via a communications line LR of a first type, and for relaying that information to subscriber terminals TA, $TA_1$, $TA_2$, ..., $TA_k$ via respective communications lines LA, $LA_1$, $LA_2$, ..., $LA_k$ of a second type.

The communications line LR of the first type may for example be an Ethernet connection. The communications lines LA, $LA_1$, $LA_2$, ..., $LA_k$ of the second type may for example be ADSL2 lines.

The DSLAM E is generally suitable for sending information coming from one of the subscriber terminals TA, $TA_1$, $TA_2$, ..., $TA_k$ via a communications line LA, $LA_1$, $LA_2$, ..., $LA_k$ of the second type to the network via the communications line LR of the first type.

In conventional manner, the communications line LA has a predetermined number of carriers. Among these carriers, M carriers are reserved for carrying information in the up direction, i.e. from the subscriber terminal TA to the DSLAM E, and N carriers $L_1, L_2, ..., L_N$ are reserved for conveying information in the down direction, i.e. from the DSLAM E to the subscriber terminal TA.

The lines $LA_2, LA_2, ..., LA_k$ represent lines neighboring the line LA.

The DSLAM E also has a device D for reducing electricity consumption that is suitable for implementing an electricity consumption reduction method of an embodiment of the invention.

Figure 2:
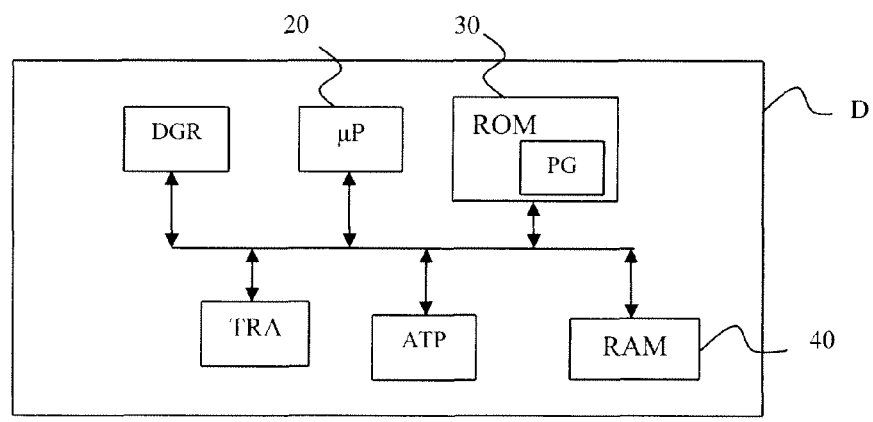
FIG. 2 is a diagram showing a first embodiment of a device for reducing electricity consumption.

With reference to FIG. 2, the reduction device D comprises in particular a processor unit 20 fitted with a microprocessor, a read only memory (ROM) 30, and a random access memory (RAM) 40.

The ROM 30 has registers storing a computer program PG having program instructions adapted to implement an electricity consumption reduction method of an embodiment of the invention, as described below in the description.

The reduction device D also has a group determination module DGR, a traffic calculation module TRA, and a power allocation module ATP.

Figure 3:
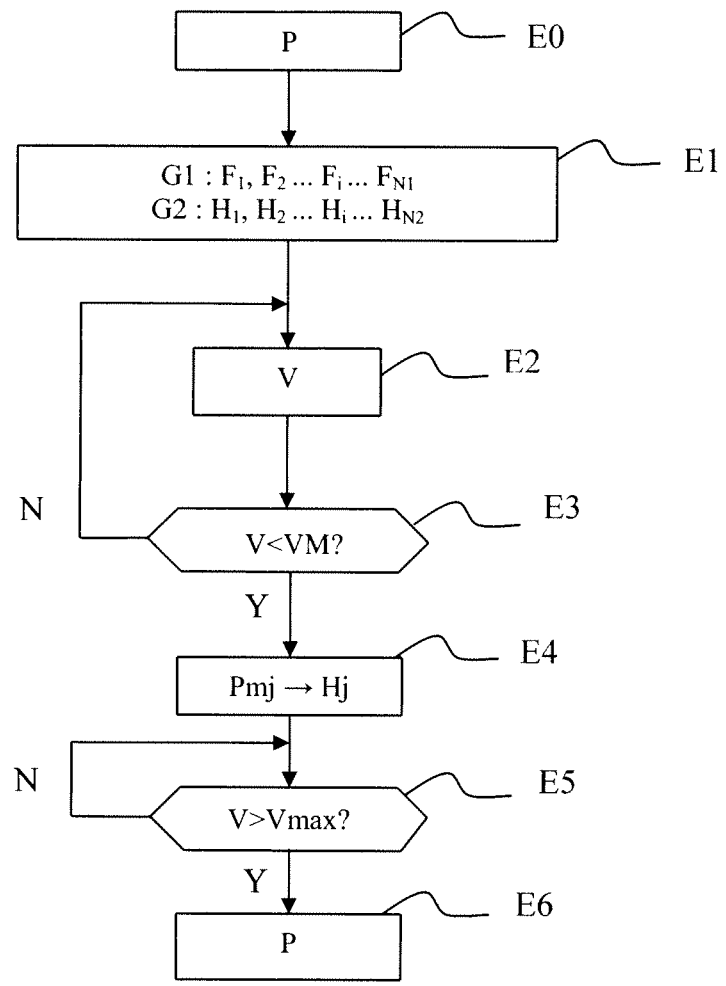
FIG. 3 is a flow chart showing the various steps in a method of an embodiment of the invention for reducing electricity consumption.

With reference to FIG. 3, there follows a description of an implementation of the electricity consumption reduction method of an embodiment of the invention implemented in the device D.

During a prior step E0, a predetermined power P is allocated to each carrier $L_1, L_2, ..., L_N$ of the set N. In known manner, the power allocated to a carrier corresponds to the maximum bit rate of the carrier, i.e. to a maximum amount of information that can be conveyed in a determined unit of time.

During a first step E1, the group determination module DGR determines both a first group G1 of carriers from among the N carriers, and also a second group G2 of carriers from among the N carriers. The groups G1 and G2 are distinct groups, i.e. a carrier in the set of N carriers cannot belong both to the first group and to the second group.

In the implementation described, each of the carriers of the set N is allocated either to the first group G1 or to the second group G2.

For example, the first group is constituted by N1 carriers $F_1, F_2, ..., F_i, F_{N1}$ and the second group is constituted by N2 carriers $H_1, H_2, ..., H_j, ..., H_{N2}$.

During a step E2, the traffic calculation module TRA determine the down traffic from the communications line LA, i.e. the volume of information V received per unit time for sending to the subscriber terminal TA via the N carriers of the communications line LA.

The step E2 is followed by a step E3 during which the volume of information V is compared with a predetermined threshold volume VM.

If the volume of information V is greater than the threshold volume VM, then step E2 is reiterated.

If the volume of information V is less than the threshold volume VM, then the power allocation module ATP acts during a step E4 to allocate a reduced power Pmj to each carrier Hj of the second group G2. The reduced power Pmj allocated to the carrier Hj is power at a value less than the power P allocated to each carrier during the prior step E0.

The power of the carriers $F_i$ of the first group G1 is not modified.

As an alternative, the step E4 is preceded by a step (not referenced in the figure) during which a request is sent to the subscriber terminal TA for agreement to reduce the bit rate, and a response containing subscriber acceptance or refusal is received in return. The step E4 is performed if the response from the client contains an acceptance. In the event of the received response being a refusal or in the event of no response being received, step E4 is not performed and the process is stopped.

The step E4 is followed by a step E5 during which the volume of information V received per unit time is once more determined and then compared with a second predetermined threshold volume Vmax. In the event of the volume of information being greater than the second predetermined threshold volume Vmax, then the power allocated to each carrier $H_j$ of the second group is once more the maximum power.

A first particular implementation is described below with reference to FIG. 4.

In this implementation, the first group determined during the group determination step E1 has the carriers $F_1, F_2, \ldots, F_{N1}$.

The first carrier $F_1$ of the first group G1 is selected randomly. For example, the carrier $F_1$ is selected as a function of a time-varying parameter, e.g. as a function of a clock type parameter.

As an alternative, the first carrier $F_1$ is the carrier $L_i$ of index i that is a predetermined number, e.g. a different number that is allocated to each of the communications lines $LA_1$, $LA_2$, ...

A spacing between two consecutive carriers of the first group G1 is also determined. For example, the spacing between two consecutive carriers of the first group G1 is a number X of carriers.

The carrier $F_2$ is determined in such a manner that it is spaced apart from the carrier $F_1$ by X carriers. The carrier $F_i$ is determined in such a manner that it is spaced apart from the carrier $F_{i-1}$ by X carriers.

The group G2 is made up of the carriers of the set of N carriers $L_1, L_2, \ldots, L_N$ that do not belong to the first group G1.

During the step E4, the power allocated to each carrier in the group G2 is a predetermined power Pmin. Pmin corresponds to the predetermined power P minus a predetermined value Y.

The configuration of this mode is described by the formula: X % Y Z in which X represents the spacing between two carriers of the group G1, Y represents the power reduction for the carriers of the second group G2, and Z represents the index of the carrier corresponding to the first carrier $F_1$.

Figure 4:
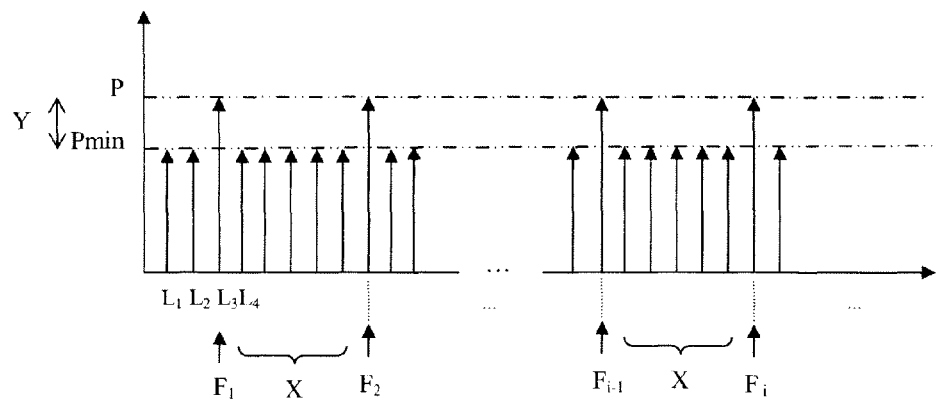
FIG. 4 is a diagram showing a first implementation of the reduction method of an embodiment of the invention.

FIG. 4 shows an example in which the first carrier $F_1$ is the carrier of index 3 and in which the spacing X between two consecutive carriers of the first group is 5.

The saving in terms of electricity consumption is large when X=10 and Y=10 dB.

A second implementation of the invention is described below with reference to FIG. 5.

In this implementation, the carriers of the first group G1 as determined in step E1 are groups of T consecutive carriers that are spaced apart by B carriers of the second group G2.

Figure 5:
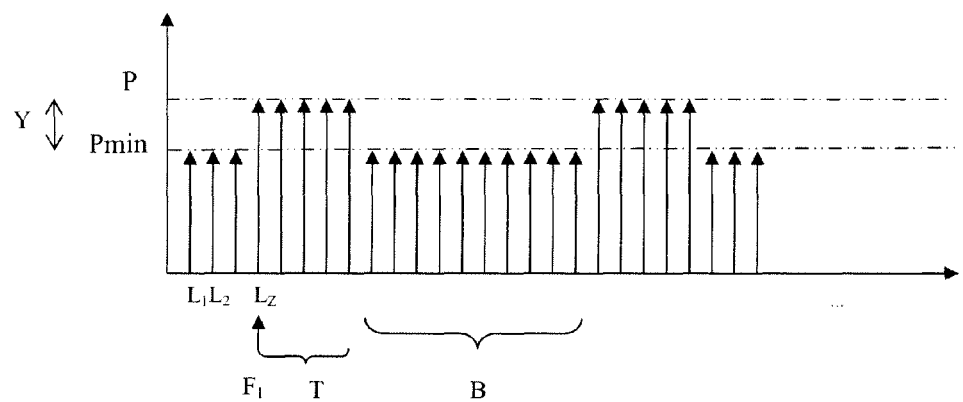
FIG. 5 is a diagram showing a second implementation of the reduction method of an embodiment of the invention.

FIG. 5 shows an example of this implementation in which T=5 and B=10.

As in the above implementation, the position of the first carrier varies randomly or as a function of a variable parameter.

In this implementation, the reduced power Pmin allocated during the step E4 to the carriers of the second group is a power that is identical for all of the carriers. The reduced power Pmin corresponds to the predetermined power P minus a constant value Y.

The configuration of this implementation may be described by the formula: B % Y Z % T in which B represents the spacing between two runs of carriers of the first group G1, Y represents the reduction of power for the carriers of the second group G2, Z represents the beginning of the first run, i.e. the index of the carrier corresponding to the first carrier $F_1$ of the first group, and T represents the number of consecutive carriers in the first group G1.

A third implementation of the invention is described below with reference to FIG. 6.

In this implementation, the first group G1 determined during the step E2 has a single carrier $F_1$ corresponding to the carrier $L_s$ of rank S, and the second group G2 comprises the (N−1) carriers that do not belong to the group G1.

The group G2 comprises two subgroups: a first subgroup G21 comprises the carriers $L_i$ of rank i less than the rank S of the carrier $F_1$, and a second subgroup G22 comprising the carriers $L_j$ of rank j greater than the rank S of the carrier $F_1$ of the group G1.

In this embodiment, the reduced power allocated in step E4 to the carriers of the second group is a power that varies as a function of the ranks of the carriers.

The reduced power allocated to the first carrier of the first subgroup G21 is a predetermined power $P_{1min}$ corresponding to the predetermined power P minus a value Q.

The reduced power allocated to the other carriers of the first subgroup G21 is a power that is determined to produce a linear distribution between the power $P_{1min}$ and the power P.

Figure 6:
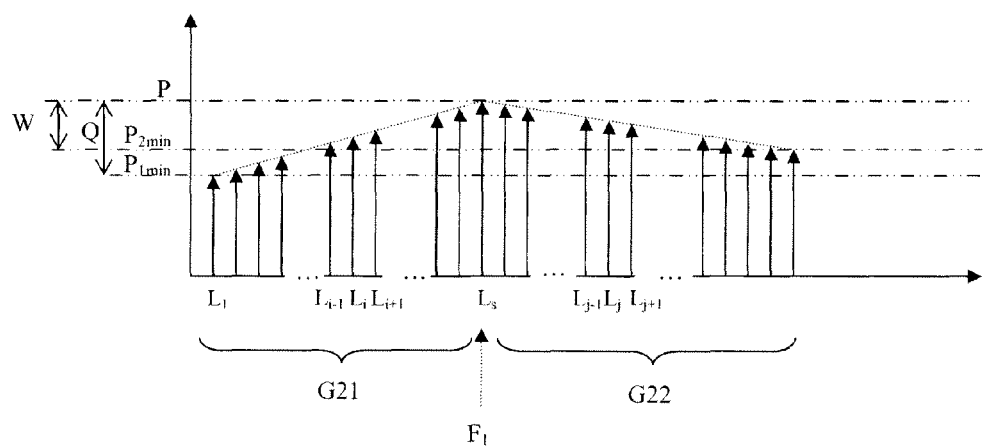
FIG. 6 is a diagram showing a third implementation of the reduction method of an embodiment of the invention.

As shown in FIG. 6, the power of a carrier $L_i$ of rank i in the first subgroup G21 is greater than the power of the preceding carrier $L_{i-1}$ of rank i−1 and less than the power of the following carrier $L_{i+}$ of rank i+1.

The power allocated to the last carrier of the second subgroup G22 is a predetermined power $P_{2min}$ corresponding to the predetermined power P minus a value W.

The power allocated to the other carriers of the second subgroup G22 is a power determined so as to produce a linear distribution between the power P and the power $P_{2min}$.

As shown in FIG. 6, the power of a carrier $L_j$ of rank j in the second subgroup G22 is less than the power of the preceding carrier $L_{j-1}$ and greater than the power of the following carrier $L_{j+1}$.

The configuration of this implementation is described by the formula: Q % S % W in which Q represents the power reduction of the first carrier of the second group G2, S represents the rank of the carrier $F_1$ of the first group, and W represents the power reduction of the last carrier of the second group G2.

In a particular instant of this implementation, the rank of the carrier of the first group G1 is 66. This index corresponds to a carrier of frequency 284,625 kilohertz (kHz). Tests have shown that this configuration gives the best results in terms of reducing electricity consumption and decreasing impacts on neighboring lines.

The invention claimed is:

1. A method of reducing electricity consumption associated with a communications line having a set of N carriers of predetermined power suitable for conveying information to a receiver device, the method comprising the following steps:
   determining first and second groups, each having respectively at least one of the carriers of the set N;
   determining a volume of information to be conveyed on the N carriers during a unit of time; and
   if the determined volume is less than a predetermined threshold, allocating a power less than the predetermined power to the carriers of the second group, the power of the carriers of the first group being maintained.

2. An electricity consumption reduction method according to claim 1, wherein the power allocated to the carriers of the second group is of a predetermined value.

3. An electricity consumption reduction method according to claim 1 wherein a carrier of the first group lies between two carriers of the second group.

4. An electricity consumption reduction method according to claim 1, wherein the first group has at least one set of consecutive carriers.

5. An electricity consumption reduction method according to claim 1, wherein the power allocated is a value lying between a predetermined minimum power value and the predetermined power.

6. An electricity consumption reduction method according to claim 1, wherein the first group is constituted by one of the carriers.

7. An electricity consumption reduction method according to claim 6, wherein the set of carriers is an ordered set, the second group comprises a first subgroup containing the carriers of rank lower than the rank of the carrier of the first group and a second subgroup containing the carriers of rank greater than the rank of the carrier of the first group, the power allocated to the carriers of the first subgroup increases as a function of the rank of the carrier, and the power allocated to the carriers of the second subgroup decrees as a function of rank.

8. A device for reducing electricity consumption associated with a communications line having a set of N carriers of predetermined power suitable for conveying information to a receiver device, wherein the device comprises:

means for determining a first group and a second group respectively comprising at least one carrier of the set N;
means for determining a volume of information to be conveyed over the N carriers during a unit of time; and
means for allocating a power less than the predetermined power to the carriers of the second group if the determined volume is less than a predetermined threshold, the power of the carriers of the first group being maintained.

9. A non-transitory computer-readable memory comprising a computer program product stored thereon and including instructions for implementing a method of reducing electricity consumption associated with a communications line having a set of N carriers of predetermined power suitable for conveying information to a receiver device, when the instructions are loaded in and executed by a processor, wherein the method comprises the following steps:

determining first and second groups, each having respectively at least one of the carriers of the set N;
determining a volume of information to be conveyed on the N carriers during a unit of time; and
if the determined volume is less than a predetermined threshold, allocating a power less than the predetermined power to the carriers of the second group, the power of the carriers of the first group being maintained.

* * * * *